(No Model.)
T. J. HUBBELL.
TREE PROP.
No. 477,939. Patented June 28, 1892.
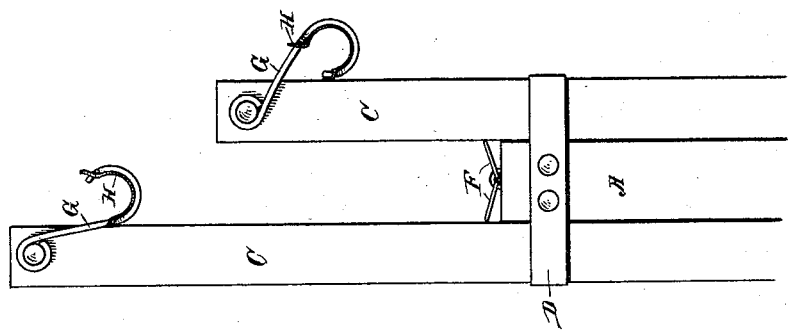
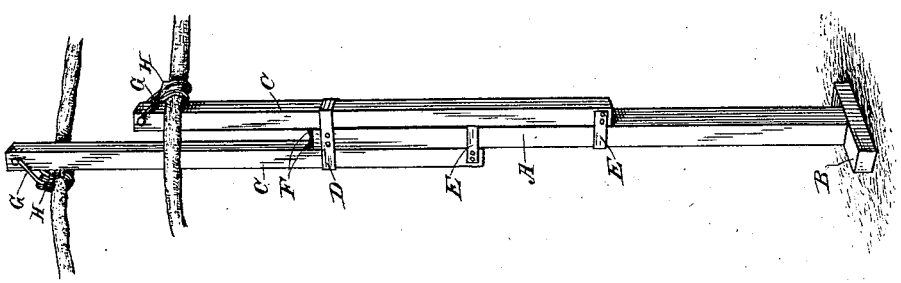
Witnesses,
Inventor,
Thomas J. Hubbell
By Dewey & Co.
Attys
THE NORRIS PETERS CO., PHOTO-LITHO., WASHINGTON, D. C.

UNITED STATES PATENT OFFICE.

THOMAS JEFFERSON HUBBELL, OF SAN BERNARDINO, CALIFORNIA.

TREE-PROP.

SPECIFICATION forming part of Letters Patent No. 477,939, dated June 28, 1892.

Application filed December 22, 1891. Serial No. 415,906. (No model.)

*To all whom it may concern:*

Be it known that I, THOMAS JEFFERSON HUBBELL, a citizen of the United States, residing at San Bernardino, San Bernardino county, State of California, have invented an Improvement in Tree-Props; and I hereby declare the following to be a full, clear, and exact description of the same.

My invention relates to a prop for holding up the limbs of trees to prevent their being broken by the weight of fruit upon them or by storms or from other causes.

It consists of a standard having one or more vertically-sliding bars connected with it, peculiarly arranged limb-holding devices, and in certain details of construction which will be more fully explained by reference to the accompanying drawings, in which—

Figure 1 is a view of my device, showing it applied to a tree for the support of two limbs. Fig. 2 shows one of the limb-supports reversed from the position shown in Fig. 1.

A is the main standard, which is made of any suitable height with relation to the trees for which the device is to be employed. This central standard has a foot or base B, which prevents its being pressed into the ground by the constant movement caused by high winds or storms, and this foot insures the height of the standard, remaining essentially the same with relation to the limbs.

C C are one or more sliding bars traveling in guides D, which are fixed to the central post near the top. In the present case these guides are in the form of clasps extending around the guides and allowing them to slip up and down freely.

At the bottom of each bar C is fixed a similar clasp or clamp E. These bottom clamps are bent, as shown, so as to fit around and slide freely upon the central post, so that when either of the sliding bars is raised it moves freely in the top stationary clasp, while the bottom clasp which is fixed to the sliding bar moves with it. It will be manifest that one or two of these sliding bars may be used as desired. For ordinary purposes a single one will be sufficient; but in cases where the tree has many limbs projecting, so that some are approximately in line above the lower ones, two of the sliding bars may be used to advantage, one being raised sufficiently to support the lower limb and the other moved up far enough to support a limb above, thus providing a support for two limbs with only one standard.

F F are pawls, which are fulcrumed to the top of the main standard A, so that their outer edges, which are toothed or sharpened, will rest against the inner sides of the sliding bars, and when these bars are to be raised to any point the pawls allow them to slip upward, but as soon as released the edges of the pawls impinge against the inner sides of the sliding bars and clamp them against the guide so that they will not slip down.

The device for holding the limbs of a tree consists of a stout hook-shaped holder G, one end of which is fulcrumed to the top of each of the slides and the other end is curved into the form of a hook of sufficient diameter to receive and hold any diameter of limb which it is desirable to support.

H is a pad or covering, of leather, cloth, canvas, or other soft material, which is fixed upon the hook-shaped holder, so that the limb may rest upon it and not become chafed by the motion which would be caused by a storm. These hooks may be turned about their fulcrum-pin, so as to hang upon the inside of the sliding bars to which they are attached, in which case the limb will rest in the upturned hook; but for purposes of greater security I prefer to turn the hooks into the position shown in Fig. 1, where the point of the hook rests against the side of the sliding bar to which it is attached, and the limb is inclosed so that it is impossible for it to be lifted out or in any way removed from the support by a storm or wind. By this construction it will be manifest that any wind which is sufficient to raise the limb will easily cause the sliding bar to move upward a slight distance, and it will then be caught and held by the dog or pawl, so that the limb will still be supported and the standard will not be lifted off the ground or moved about in such a way that it will cease to support the limb. With the ordinary open support at the top of the standard the limbs are apt to be blown out by high winds, and without the broad foot, which I have here shown, the point of support may be forced into the soft ground by a constant swaying and moving of the branches in the upper part until the standard is too short to properly support the limb.

Having thus described my invention, what I claim as new, and desire to secure by Letters Patent, is—

In a tree-prop, a single standard having a broad foot or base, a double guide fixed to the top of the standard, extending out and forming a clasp upon each side thereof, two sliding bars fitting within said guiding-clasps and moving vertically and parallel with the main standard, a clasp fixed to the bottom of each of these bars and encircling the main standard one above the other, pawls fulcrumed to the top of the standard, projecting so as to impinge against and bind the two sliding bars, and hook-shaped reversible limb-supports fulcrumed to the top of the sliding bars with interior protecting-cushions, whereby the single standard may be moved so as to support two limbs at the same time from a single standard, substantially as herein described.

In witness whereof I have hereunto set my hand.

THOMAS JEFFERSON HUBBELL.

Witnesses:
S. WEATHERHART,
C. F. KELLEY.